(12) United States Patent
Hawkins

(10) Patent No.: US 7,836,854 B1
(45) Date of Patent: Nov. 23, 2010

(54) PET BATHING APPARATUS

(76) Inventor: Stephanie Hawkins, 5136 Penn St., Philadelphia, PA (US) 19124

( * ) Notice: Subject to any disclaimer, the term of this patent is extended or adjusted under 35 U.S.C. 154(b) by 187 days.

(21) Appl. No.: 12/151,670

(22) Filed: May 8, 2008

Related U.S. Application Data

(60) Provisional application No. 60/928,775, filed on May 10, 2007.

(51) Int. Cl.
*A01K 29/00* (2006.01)

(52) U.S. Cl. .................. 119/650; 119/651; 119/600; 119/604; 119/613; 119/665

(58) Field of Classification Search ............ 119/650, 119/651, 665, 671, 673, 676, 753, 755; 401/261
See application file for complete search history.

(56) References Cited

U.S. PATENT DOCUMENTS

| | | | | |
|---|---|---|---|---|
| 77,435 | A * | 5/1868 | Albert | 119/755 |
| 1,401,393 | A * | 12/1921 | Cross | 119/755 |
| 1,879,915 | A | 9/1932 | Smoot | |
| 2,736,904 | A * | 3/1956 | Suggs | 4/577.1 |
| 3,266,464 | A * | 8/1966 | Davis | 119/756 |
| 4,316,433 | A * | 2/1982 | Hebert | 119/673 |
| 4,911,106 | A * | 3/1990 | Goodwin | 119/724 |
| 5,109,553 | A | 5/1992 | Kishimoto | |
| 5,193,487 | A * | 3/1993 | Vogel | 119/671 |
| 5,213,064 | A * | 5/1993 | Mondine et al. | 119/671 |
| 5,488,926 | A * | 2/1996 | Hunt | 119/756 |
| 5,960,746 | A * | 10/1999 | Salts | 119/756 |
| 5,974,601 | A | 11/1999 | Drane et al. | |
| 6,196,600 | B1 * | 3/2001 | Miller | 294/1.4 |
| 6,651,588 | B1 * | 11/2003 | Penzimer | 119/604 |
| 7,155,758 | B1 * | 1/2007 | Berke et al. | 4/675 |
| 7,219,625 | B2 * | 5/2007 | Powers | 119/651 |
| 7,389,747 | B2 * | 6/2008 | Inahara et al. | 119/677 |
| 2001/0034890 | A1 * | 11/2001 | Levas | 2/48 |
| 2005/0132979 | A1 * | 6/2005 | Powers | 119/753 |
| 2007/0295285 | A1 * | 12/2007 | Smith et al. | 119/753 |

FOREIGN PATENT DOCUMENTS

DE 4109393 A1 * 9/1992

* cited by examiner

*Primary Examiner*—Timothy D Collins
*Assistant Examiner*—Joshua Huson
(74) *Attorney, Agent, or Firm*—Emery L. Tracy

(57) ABSTRACT

A pet bathing apparatus for facilitating the easy and efficient bathing of a pet is provided. The pet bathing apparatus comprises a basin having two end walls and two side walls positioned between and perpendicular to the end walls. A plurality of screen covered drains are formed in at least one of the end walls of the basin. A rail is positioned adjacent each end wall between the side walls. A pair of shackle pieces are moveable along each rail. A first tightening screw extends through the shackle pieces and tightenable against the rail for releasably securing each of the shackle pieces in place. A receiving opening formed in each leg shackle. A second tightening screw extends into the receiving opening. A plurality of leg shackles are connected to the rails with each leg shackle having a vertical section extending into the receiving opening of the shackle piece and a horizontal section extending from an end of the vertical section with the second tightening screw tightenable against the vertical section. A closure mechanism extends from an end of the horizontal section of each of the leg shackles. A mesh screen is positionable in the basin. In addition, a shampoo dispenser is provided.

12 Claims, 2 Drawing Sheets

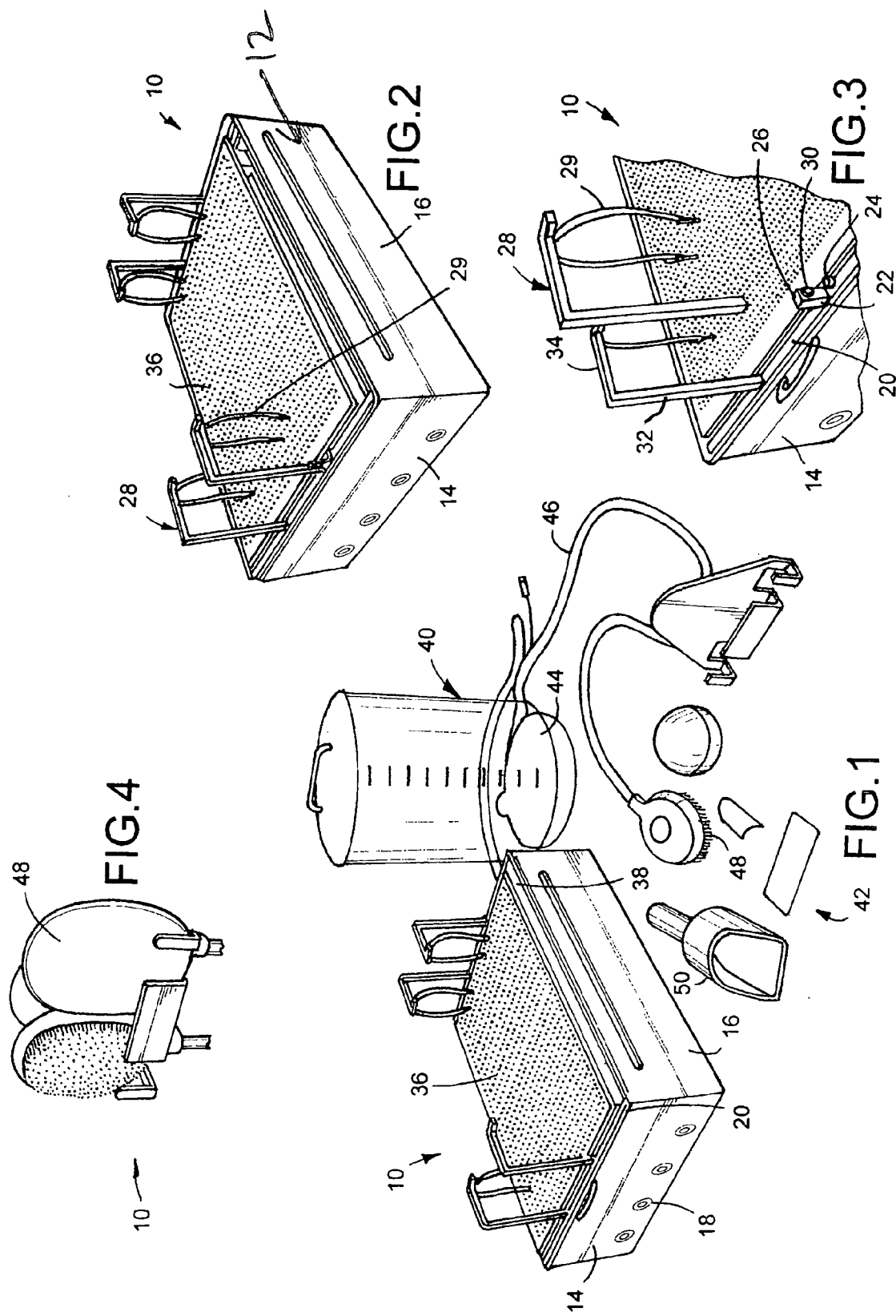

PET BATHING APPARATUS

The present application claims benefit of priority of pending provisional patent application Ser. No. 60/928,775, filed on May 10, 2007, entitled "Pet Bathing Apparatus".

BACKGROUND OF THE INVENTION

1. Field of the Invention

This invention relates generally to a pet bathing apparatus and, more particularly, the invention relates to a pet bathing apparatus which is a bathtub insert specifically designed to provide consumers an easy means of bathing their animals.

2. Description of the Prior Art

America is a country of dog and cat lovers. In fact, according to the American Pet Products Manufacturers Association, (APPMA) there are approximately 68 million owned dogs in the United States and 73 million owned cats. Pets provide unconditional love, companionship and unmatched loyalty to their owners. While dogs are known as "man's best friend", providing protection and happy companionship, cats are more independent, yet nonetheless, still offer love and warmth. For many owners, a favorite end to a hectic day is spent curled up on a sofa or chair, with a beloved pet nestled nearby.

Because dogs and cats are more often considered a member of the family, as opposed to merely a pet, most owners provide adequate shelter, a healthy diet and a regular routine of bathing and grooming for their animals. Regularly bathing one's dog, or even a self-grooming cat is an important part of pet care. Killing germs, bating odors, and ridding the pet of pests such as fleas and ticks, a regular bath is crucial for a pet's overall health.

While regularly bathing an animal is a crucial aspect of proper pet care, doing so is not without drawbacks. Specifically, most animals do not enjoy being bathed. Jumping out of the tub and soaking their owner, giving a dog or cat a bath can be a completely frustrating experience. Holding the animal down with one hand and applying pet shampoo with the other can be nearly impossible, especially if the pet is fighting to climb out of the tub. Furthermore, even after the pet has been bathed and dried, the trouble does not end for most pet owners, as animal fur can easily clog plumbing. Digging animal hair out of the drain and cleaning stray fur from the walls of the tub, bathing a pet can not only be difficult, it can also create quite a mess.

SUMMARY

The present invention is a pet bathing apparatus for facilitating the easy and efficient bathing of a pet. The pet bathing apparatus comprises a basin having two end walls and two side walls positioned between and perpendicular to the end walls. A plurality of screen covered drains are formed in at least one of the end walls of the basin. A rail is positioned adjacent each end wall between the side walls. A pair of shackle pieces are moveable along each rail. A first tightening screw extends through the shackle pieces and tightenable against the rail for releasably securing each of the shackle pieces in place. A receiving opening formed in each leg shackle. A second tightening screw extends into the receiving opening. A plurality of leg shackles are connected to the rails with each leg shackle having a vertical section extending into the receiving opening of the shackle piece and a horizontal section extending from an end of the vertical section with the second tightening screw tightenable against the vertical section. A closure mechanism extends from an end of the horizontal section of each of the leg shackles. A mesh screen is positionable in the basin. In addition, a shampoo dispenser is provided.

The present invention further includes a method for facilitating the easy and efficient bathing of a pet. The method comprises providing a basin having two end walls and two side walls positioned between and perpendicular to the end walls and forming a plurality of screen covered drains in at least one of the end walls of the basin. The method further includes positioning a rail adjacent each end wall between the side walls and moving a pair of shackle pieces along each rail. Further, the method includes extending a first tightening screw through the shackle pieces, tightening the first tightening screw, forming a receiving opening in each leg shackle, and extending a second tightening screw into the receiving opening. Additionally, the method includes providing a plurality of leg shackles with each leg shackle having a vertical section and a horizontal section, extending the vertical section into the receiving opening of the shackle piece, extending the horizontal section from an end of the vertical section, and tightening the second tightening screw against the vertical section. The method finally includes extending a closure mechanism from an end of the horizontal section of each of the leg shackles, positioning a mesh screen in the basin, and providing a shampoo dispenser.

BRIEF DESCRIPTION OF THE DRAWINGS

FIG. 1 is a perspective view illustrating a pet bathing apparatus, constructed in accordance with the present invention;

FIG. 2 is a perspective view illustrating the removable screen and grate and leash tie off of the pet bathing apparatus, constructed in accordance with the present invention;

FIG. 3 is a perspective view illustrating the leash tie off of the pet bathing apparatus, constructed in accordance with the present invention; and FIG. 4 is a perspective view illustrating a hanger for brushes attachable to the tub of the pet bathing apparatus, constructed in accordance with the present invention;

DETAILED DESCRIPTION OF THE PREFERRED EMBODIMENTS

Figure 5:
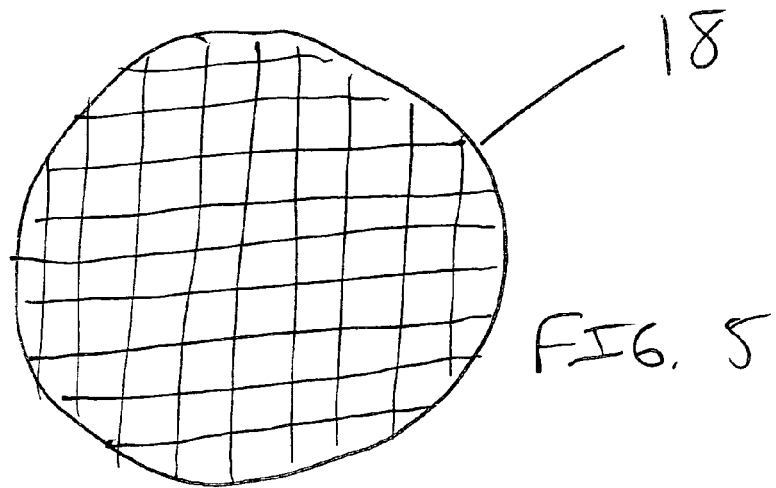
FIG. 5 is an elevational side view illustrating a screen cover of the pet bathing apparatus, constructed in accordance with the present invention.
Figure 6:
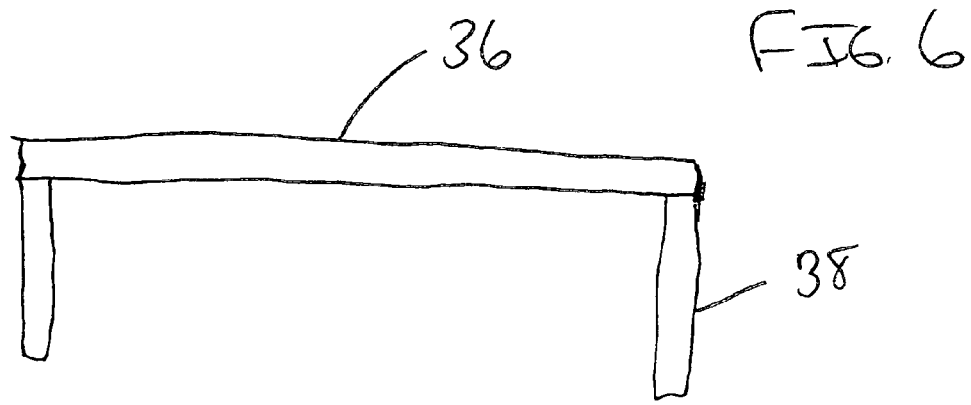
FIG. 6 is an elevational side view illustrating the plurality of legs for the mesh screen of the pet bathing apparatus, constructed in accordance with the present invention.
Figure 7:
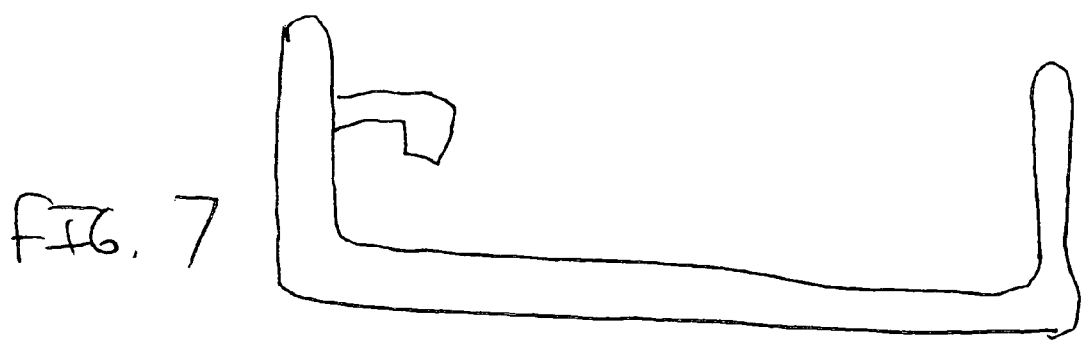
FIG. 7 is an elevational side view illustrating faucet of the pet bathing apparatus, constructed in accordance with the present invention.

As illustrated in FIGS. 1-4, the present invention is a pet bathing apparatus, indicated generally at 10, for facilitating the easy and efficient bathing of any pet, including dogs and cats. The pet bathing apparatus 10 of the present invention is basically a bathtub insert specifically designed to provide consumers an easy means of bathing their animals.

The pet bathing apparatus 10 of the present invention includes a basin 12 having two end walls 14 and two side walls 16 positioned between and perpendicular to the end walls 14. In addition, a plurality of screen covered drains 18 are formed in the end walls 14 of the basin 12 allowing water to drain from the basin 12 while catching hair and the like. A rail 20 is positioned adjacent each end wall 14 between the side walls 16. Each rail 20 has two shackle pieces 22 moveable therealong. A tightening screw 24 extends through the shackle pieces 22 and is tightenable against the rail 20 for releasably securing each of the shackle pieces 22 in place. Furthermore, each shackle piece 22 includes a receiving opening 26 for receiving a leg shackle 28 with a tightening screw 30 extending into the receiving opening 26 against the leg shackle 28 for releasably adjusting the height of each leg shackle 28, as further described below.

In addition, the leg shackle 28 of the pet bathing apparatus 10 of the present invention includes four leg shackles 28 with each leg shackle having a vertical section 32 extending into the receiving opening 26 of the shackle piece 22 and a horizontal section 34 extending from an end of the vertical section 32. In a preferred embodiment, two leg shackles 28 are positioned adjacent each end wall 14. As noted, the tightening screws 24 are a releasable locking hinge mechanism allowing the leg shackles 28 to be moved up and downward according to the animal's height, the leg shackles 28 hang over the end walls 14 of the basin and are positionable closer together or further apart, depending on the size of the animal. Featuring adjustable C-shaped closures 29 hanging from the end of the horizontal section 34, the adjustable leg shackles 28 preferably have a soft, rubber padding, for added comfort.

Further, the pet bathing apparatus 10 of the present invention has a rectangular shaped mesh screen 36 preferably measuring approximately twenty-four (24") inches in width and forty-eight (48") inches in length positionable in the basin 12. The mesh screen 36 can include a plurality of legs 38 for supporting the mesh screen 36 in the basin 12.

The pet bathing apparatus 10 of the present invention further includes a handy shampoo dispenser 40 with removable attachments 42. Designed to be wall mounted, the shampoo dispenser 40 easily connects to any bathtub faucet and features a convenient battery or electrically operated pumping mechanism 44 conveniently dispensing shampoo through an ample shower hose 46 and out through a detachable brush 48 or shower nozzle. Additional accessories for the pet bathing apparatus 10 include a pet waste scooper 50, gloves, and a protective apron.

The manner of use of the pet bathing apparatus 10 of the present invention will now be described. It will be understood by those skilled in the art that the manner of use of the pet bathing apparatus 10 described herein is merely one method of use and other methods of use of the pet bathing apparatus 10 are within the scope of the present invention.

Use of the pet bathing apparatus 10 of the present invention is very simple and straightforward. After mounting the convenient shampoo dispenser 40 and filling the shampoo dispenser 40 with pet shampoo, conditioner or flea bath, the user attaches the shower hose 46 and nozzle head 48, readying the pet bathing apparatus 10 for use. Next, the user places the handy screen 36 on the basin 12, on the bottom of their bathtub or inside a large, utility sink. The user attaches the four leg shackles 29 to the receiving opening 26 on the rails 20 on the end walls 14 of the basin 12, positioning the leg shackles 29 so that they comfortably surround the dog's or cat's legs, when the animal is standing upright. Lifting the pet into the bathtub, the user sets the animal directly on top of the mesh screen 12. After securing the leg shackles 29 around each of the animal's legs, the user makes any necessary adjustments to ensure the animal's comfort. Next, the user fills the basin 12 with warm water and holds the dispenser hose 46 in one hand while pumping shampoo onto their pet. Using the brush attachment 48 to lovingly brush and soap their pet's coat, the user gently scrubs the animal's fur, rinsing the pet off with warm water when finished. The user then drains the water from the basin 12, allowing all excess pet hair to gather on top of the screen. While held safely and securely in place by the shackles 29, the cat or dog can shake off the excess water and the user then towels or blow-dries the animal's coat. Once the animal is dry, the user releases the four shackles 29 and removes the animal from the tub. At this step, clean up is easy.

Removing the pet screen 36 from the basin 12, the user brushes off any loose pet hair, storing the screen 36 until again needed. The shampoo dispenser 40 and leg shackles 29 are left in place within the basin 12, providing quick and easy access when the time came to bathe the pet again.

There are many significant benefits and advantages associated with the pet bathing apparatus 10 of the present invention. Foremost, the pet bathing apparatus 10 provides the animal lover with an efficient and easy-to-use means of bathing their pet. Providing all the tools necessary for a thorough and healthy cleaning, use of the pet bathing apparatus 10 allows consumers to bathe their pets in a quick and orderly fashion. Securely, yet comfortably holding the pet in the standing position, use of the pet bathing apparatus 10 prevents the dog or cat from jumping out of the tub, soaking their owners, and creating a huge mess during bath time. This advantage proves especially beneficial for owners of large or hard to control animals. Keeping the animal still, use of the pet bathing apparatus 10 with adjustable leg shackles 29 ensures that the animal can be washed, rinsed, and conditioned thoroughly, while the owner remains neat and dry. Another advantage is that the ample mesh screen efficiently gathers all loose animal fur, preventing it from clogging the drain and sullying the bathtub. Consumers will also appreciate the handy accessories. In particular, the shampoo dispenser as well as the handy brush and nozzle attachments facilitate the task of bathing one's pet. Evenly distributing shampoo and conditioner on the pet's body, use of the pet bathing apparatus' shampoo dispenser proves a convenient alternative to applying products by hand. Although intended for home use, professional pet groomers, breeders and veterinarians will also appreciate the many benefits associated with the pet bathing apparatus 10.

The pet bathing apparatus 10 of the present invention provides pet lovers an easy means of grooming their pet. Simple to use and safe for the animal, the bath liner and accessories proves an invaluable tool for any pet owner.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A pet bathing apparatus for facilitating the easy and efficient bathing of a pet, the pet bathing apparatus comprising:
   a basin having two end walls and two side walls positioned between and perpendicular to the end walls;
   a plurality of screen covered drains formed in at least one of the end walls of the basin;
   a rail positioned along each end wall between the side walls, the rails located entirely below the top of the end walls;
   a pair of shackle pieces moveable along each rail;

a first tightening screw extending through the shackle pieces and tightenable against the rail for releasably securing each of the shackle pieces in place;

a receiving opening formed in each shackle;

a second tightening screw extending into the receiving opening;

four leg shackles, each leg shackle having a vertical section extending into the receiving opening of one of the shackle pieces and a horizontal section extending from an end of the vertical section, the second tightening screw tightenable against the vertical section;

a closure mechanism extending from an end of the horizontal section of each of the leg shackles;

a mesh screen positionable in the basin; and a shampoo dispenser;

wherein a pair of leg shackles are positioned and movable adjacent one end wall and another pair of leg shackles are positioned and movable adjacent the other end wall such that the pet maintains a standing position.

2. The pet bathing apparatus of claim 1 wherein the closure mechanisms are C-shaped closures hanging from the end of the horizontal section.

3. The pet bathing apparatus of claim 1 wherein the closure mechanisms have a soft, rubber padding.

4. The pet bathing apparatus of claim 1 wherein the mesh screen is rectangular.

5. The pet bathing apparatus of claim 1 wherein the mesh screen includes a plurality of legs for supporting the mesh screen in the basin.

6. The pet bathing apparatus of claim 1 wherein the shampoo dispenser fluidly connects to a bathtub faucet.

7. The pet bathing apparatus of claim 1 wherein the shampoo dispenser has an electrically operated pumping mechanism.

8. The pet bathing apparatus of claim 1 and further comprising at least one of the following:

a pet waste scooper, gloves, or a protective apron.

9. A pet bathing apparatus for facilitating the easy and efficient bathing of a pet, the pet bathing apparatus comprising:

a basin having two end walls and two side walls positioned between and perpendicular to the end walls;

a plurality of screen covered drains formed in at least one of the end walls of the basin;

a rail positioned along each end wall between the side walls, the rails located entirely below the top of the end walls;

a pair of shackle pieces moveable along each rail;

a first tightening screw extending through the shackle pieces and tightenable against the rail for releasably securing each of the shackle pieces in place;

a receiving opening formed in each shackle;

a second tightening screw extending into the receiving opening;

four leg shackles, each leg shackle having a vertical section extending into the receiving opening of one of the shackle pieces and a horizontal section extending from an end of the vertical section, the second tightening screw tightenable against the vertical section;

a closure mechanism extending from an end of the horizontal section of each of the leg shackles, the closure mechanisms are C-shaped closures hanging from the end of the horizontal section;

a mesh screen positionable in the basin;

a shampoo dispenser, the shampoo dispenser fluidly connects to a bathtub faucet; and a pet waste scooper;

wherein a pair of leg shackles are positioned and moveable adjacent one end wall and another pair of leg shackles are positioned and moveable adjacent the other end wall such that the pet maintains a standing position.

10. The pet bathing apparatus of claim 9 wherein the closure mechanisms have a soft, rubber padding.

11. The pet bathing apparatus of claim 9 wherein the mesh screen includes a plurality of legs for supporting the mesh screen in the basin.

12. The pet bathing apparatus of claim 9 wherein the shampoo dispenser has an electrically operated pumping mechanism allowing dispensing of shampoo through a shower hose and out through a detachable brush or shower nozzle.

\* \* \* \* \*